United States Patent
Nishihata et al.

(10) Patent No.: US 9,575,289 B2
(45) Date of Patent: Feb. 21, 2017

(54) IMAGING LENS AND IMAGING APPARATUS INCLUDING THE SAME

(71) Applicant: FUJIFILM Corporation, Tokyo (JP)

(72) Inventors: Sumihiro Nishihata, Saitama-ken (JP); Yoshiaki Ishii, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/474,693

(22) Filed: Sep. 2, 2014

(65) Prior Publication Data

US 2015/0062726 A1  Mar. 5, 2015

(30) Foreign Application Priority Data

Aug. 30, 2013 (JP) .................... 2013-179022

(51) Int. Cl.
  *G02B 13/18* (2006.01)
  *G02B 3/02* (2006.01)
  *G02B 9/60* (2006.01)
  *G02B 13/00* (2006.01)

(52) U.S. Cl.
  CPC .................. *G02B 13/0045* (2013.01)

(58) Field of Classification Search
  CPC .................. G02B 13/18; G02B 9/60
  USPC .................. 359/770, 753, 714, 764
  See application file for complete search history.

(56) References Cited

U.S. PATENT DOCUMENTS 8,804,253 B2   8/2014  Tsai et al.
2012/0218647 A1*  8/2012  Yonezawa .......... G02B 13/0045
                                                                359/714

FOREIGN PATENT DOCUMENTS

CN   201903684   7/2011
CN   202383347   8/2012

* cited by examiner

*Primary Examiner* — Alicia M Harrington
(74) *Attorney, Agent, or Firm* — Young & Thompson

(57) ABSTRACT

The imaging lens substantially consists of a first lens having a biconvex shape, a second lens having a negative refractive power, a third lens having a negative refractive power and a convex surface that faces the object side, a fourth lens having a positive refractive power, and a fifth lens having a negative refractive power, of which at least one of the object-side surface and the image-side surface has at least one inflection point, in this order from the object side; and wherein conditional expression (1A): $-0.38 < f/f45 < -0.01$ is satisfied. This conditional expression is related to the focal length f of the entire system and the combined focal length f45 of the fourth lens and the fifth lens.

17 Claims, 12 Drawing Sheets

EXAMPLE 1

EXAMPLE 2

IMAGING LENS AND IMAGING APPARATUS INCLUDING THE SAME

CROSS-REFERENCE TO RELATED APPLICATIONS

The present application claims priority under 35 U.S.C. §119 to Japanese Patent Application No. 2013-179022, filed Aug. 30, 2013. Each of the above application is hereby expressly incorporated by reference, in its entirety, into the present application.

BACKGROUND OF THE INVENTION

Technical Field

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, tablet type terminals, and a portable gaming device.

Description of the Related Art

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having five lens configurations and six lens configurations, which are comparatively large numbers of lenses, has been proposed. For example, Patent Documents 1 and 2 (Chinese Utility Model Publication No. 202383347 and Chinese Utility Model Publication No. 201903684) propose imaging lenses having a five lens configuration, in which a first lens having a positive refractive power, a second lens having a negative refractive power, a third lens having a negative refractive power, a fourth lens having a positive refractive power, and a fifth lens having a negative refractive power are arranged in this order from the object side.

SUMMARY OF THE INVENTION

Meanwhile, accompanying the increase in the numbers of pixels in the imaging elements as described above, reduction of pixel sizes in the imaging elements is advancing, with respect to imaging lenses having comparatively short total lengths which are for use in cellular telephones, smart phones, and tablet type terminals in particular. Therefore, there is demand for an imaging lens with high performance and further with a small F number, which is compatible with compact imaging elements. The F numbers of the imaging lenses disclosed in Patent Documents 1 and 2 are too large and there are difficulties in applying these lenses for use with compact imaging elements that can realize a desired high resolution in response to the above demand.

The present invention has been developed in view of the foregoing problems. The object of the present invention is to provide an imaging lens that can realize high imaging performance while having a short total length and a small F number. It is another object of the present invention to provide an imaging apparatus equipped with the imaging lens, which is capable of obtaining high resolution photographed images.

A first imaging lens of the present invention substantially consists of five lenses, including:
  a first lens having a biconvex shape
  a second lens having a negative refractive power;
  a third lens having a negative refractive power and a convex surface that faces the object side;
  a fourth lens having a positive refractive power;
  a fifth lens having a negative refractive power, of which at least one surface of an object-side surface and an image-side surface has at least one inflection point, in this order from the object side; and conditional expression (1A) below is satisfied:

$$-0.38 < f/f45 < -0.01 \quad \quad (1A),\text{ where}$$

f: the focal length of the entire system, and
f45: the combined focal length of the fourth lens and the fifth lens.

In the first imaging lens of the present invention, it is preferable for the fifth lens to be of a biconcave shape.

A second imaging lens of the present invention substantially consists of five lenses, including:
  a first lens which is of a biconvex shape;
  a second lens having a negative refractive power;
  a third lens having a negative refractive power and a convex surface that faces the object side;
  a fourth lens having a positive refractive power;
  a fifth lens having a biconcave shape, of which at least one surface of the object-side surface and the image-side surface has at least one inflection point, in this order from the object side; and
  conditional expression (1B) below is satisfied:

$$f/f45 < 0 \quad \quad (1B),\text{ where}$$

f: the focal length of the entire system, and
f45: the combined focal length of the fourth lens and the fifth lens.

In the second imaging lens of the present invention, it is preferable for conditional expression (1B-1) below to be satisfied, and more preferable for conditional expression (1B-2) below to be satisfied:

$$-2 < f/f45 < 0 \quad \quad (1B\text{-}1)$$

$$-1 < f/f45 < 0 \quad \quad (1B\text{-}2).$$

It is preferable for the first imaging lens and the second imaging lens of the present invention to satisfy any of conditional expressions (1A-1), (1A-2), (2), (2-1), (2-2), (3), (3-1), and (3-2) below. Preferably, any one of these conditional expressions may be satisfied, or arbitrary combinations thereof may be satisfied.

$$-0.27 < f/f45 < -0.015 \qquad (1A\text{-}1)$$

$$-0.25 < f/f45 < -0.02 \qquad (1A\text{-}2)$$

$$1.7 < (R2f-R2r)/(R2f+R2r) \qquad (2)$$

$$1.7 < (R2f-R2r)/(R2f+R2r) < 4 \qquad (2\text{-}1)$$

$$1.8 < (R2f-R2r)/(R2f+R2r) < 3.5 \qquad (2\text{-}2)$$

$$0 < f/f4 < 1.9 \qquad (3)$$

$$0 < f/f4 < 1.8 \qquad (3\text{-}1)$$

$$0 < f/f4 < 1.75 \qquad (3\text{-}2), \text{ where}$$

f: the focal length of the entire system,
f45: the combined focal length of the fourth lens and the fifth lens,
f4: the focal length of the fourth lens,
R2f: the paraxial radius of curvature of the object-side surface of the second lens, and
R2r: the paraxial radius of curvature of the image-side surface of the second lens.

In the first imaging lens and the second imaging lens of the present invention, it is preferable for the second lens to be of a biconcave shape.

In the first imaging lens and the second imaging lens of the present invention, it is preferable for the fourth lens to be of a meniscus shape having a convex surface that faces the image side.

In the first imaging lens and the second imaging lens of the present invention, it is preferable for an aperture stop to be disposed between the object-side surface of the first lens and the object-side surface of the second lens.

In the first imaging lens and the second imaging lens of the present invention, the expression "substantially consisting of five lenses" intends to mean that the first imaging lens and the second imaging lens of the present invention may include lenses substantially without any refractive power; optical elements other than lenses such as aperture stops, cover glasses, and the like; lens flanges; lens barrels; and mechanical component such as image stabilization mechanisms in addition to the five lenses.

Note that the surface shapes and the signs of the refractive powers of the above lens should be considered in paraxial regions if aspheric surfaces are included therein. The sign of the radius of curvature of a lens surface is positive in the case that a surface shape is convex on the object side, and negative in the case that the surface shape is convex on the image side.

An imaging apparatus according to the present invention is equipped with the imaging lens of the present invention.

According to the imaging lenses of the present invention, the configuration of each lens element in a five lens configuration as a whole is optimized. Particularly, the shapes of the first lens, the third lens, and the fifth lens are favorably configured, and predetermined conditional expressions are satisfied. Therefore, lens systems having a small F number and high imaging performance while having a shortened total length can be realized.

In addition, the imaging apparatus of the present invention is equipped with the imaging lens of the present invention described above, and therefore is capable of reducing the size of the apparatus in the direction of the optical axis and of obtaining high resolution photographed images.

DESCRIPTION OF THE PREFERRED EMBODIMENTS

Hereinafter, embodiments of the present invention will be described in detail with reference to the accompanying drawings.

FIGS. 1-5 each include a dotted line on the third lens L3 that shows an enlarged, exaggerated shape of the surface of the object side of the lens.

Figure 1:
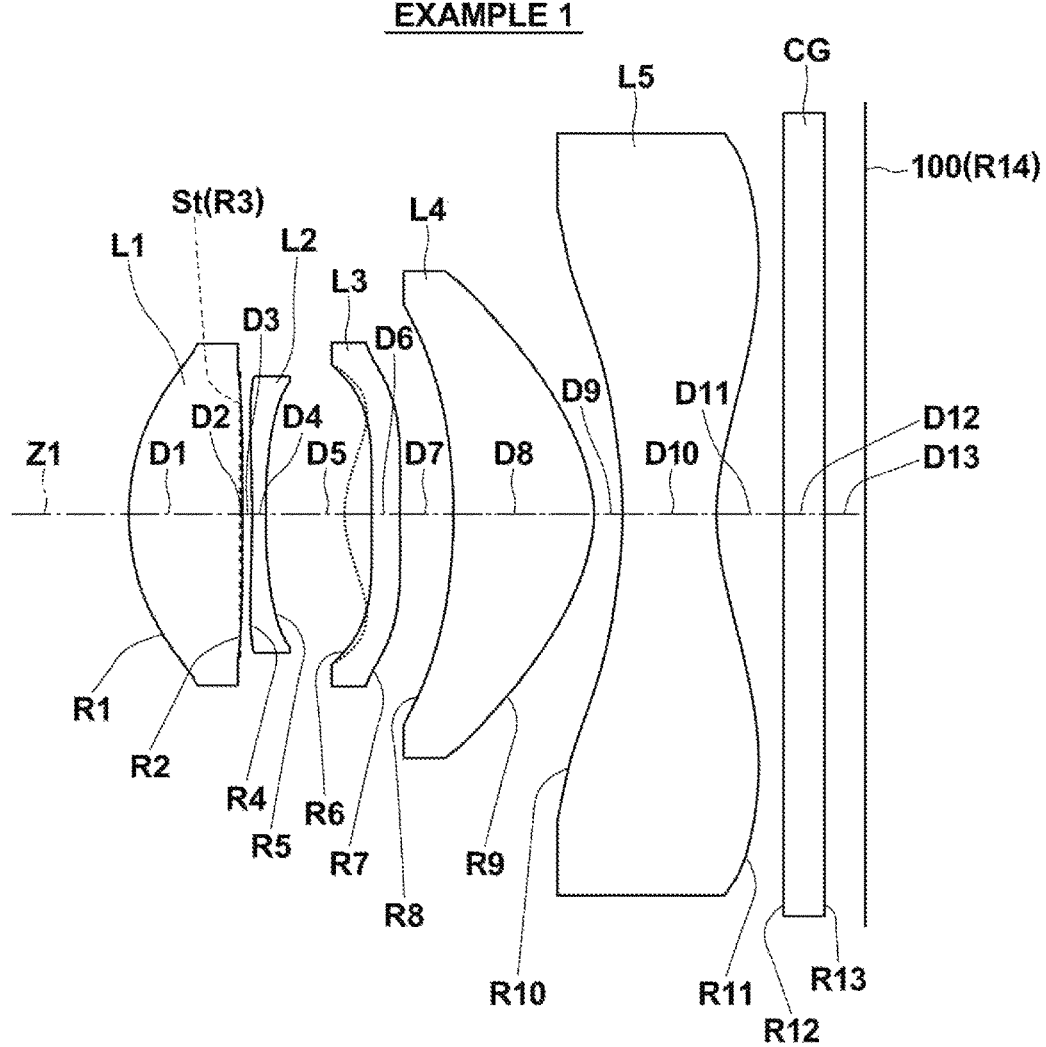
FIG. 1 is a sectional diagram that illustrates a first example of the configuration of an imaging lens according to an embodiment of the present invention, and corresponds to an imaging lens of Example 1.
Figure 2:
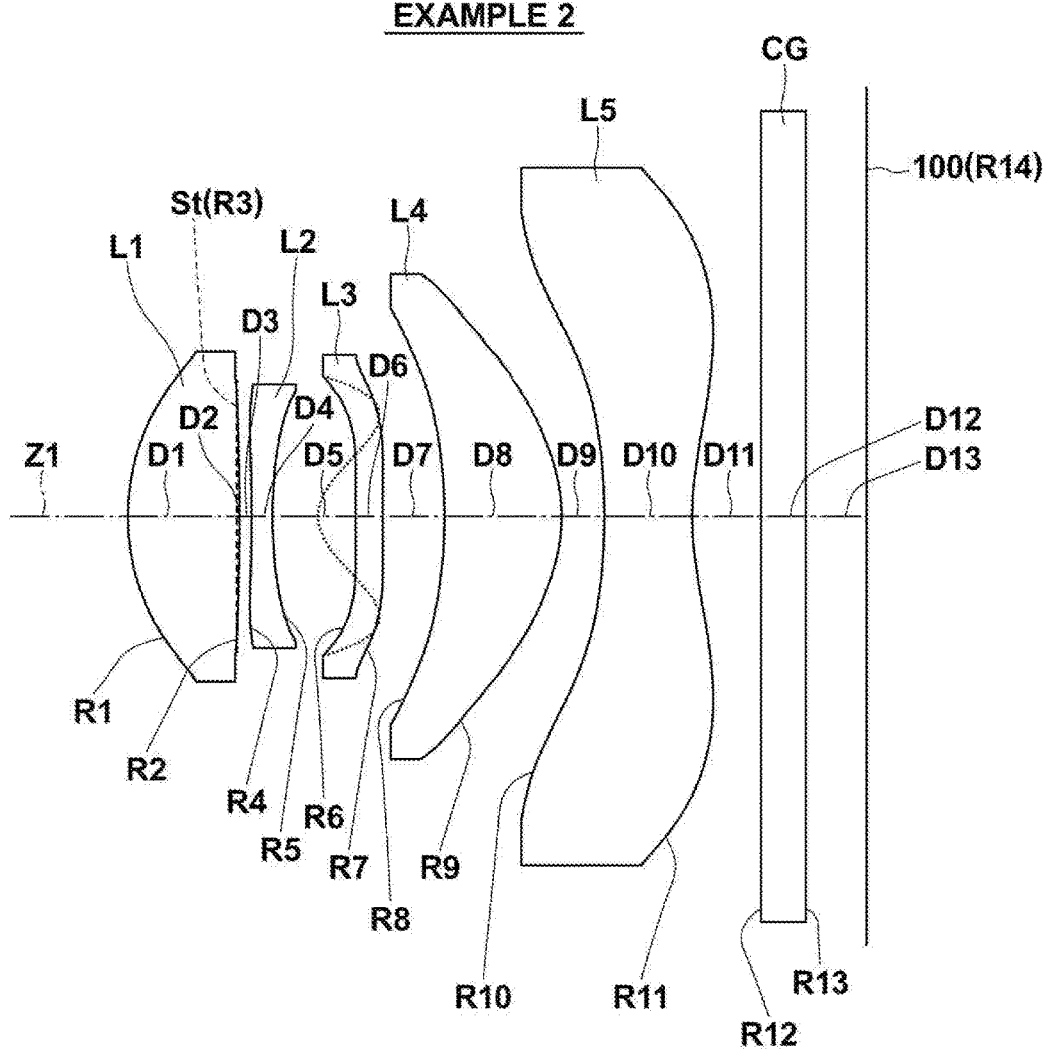
FIG. 2 is a sectional diagram that illustrates a second example of the configuration of an imaging lens according to an embodiment of the present invention, and corresponds to an imaging lens of Example 2.
Figure 3:
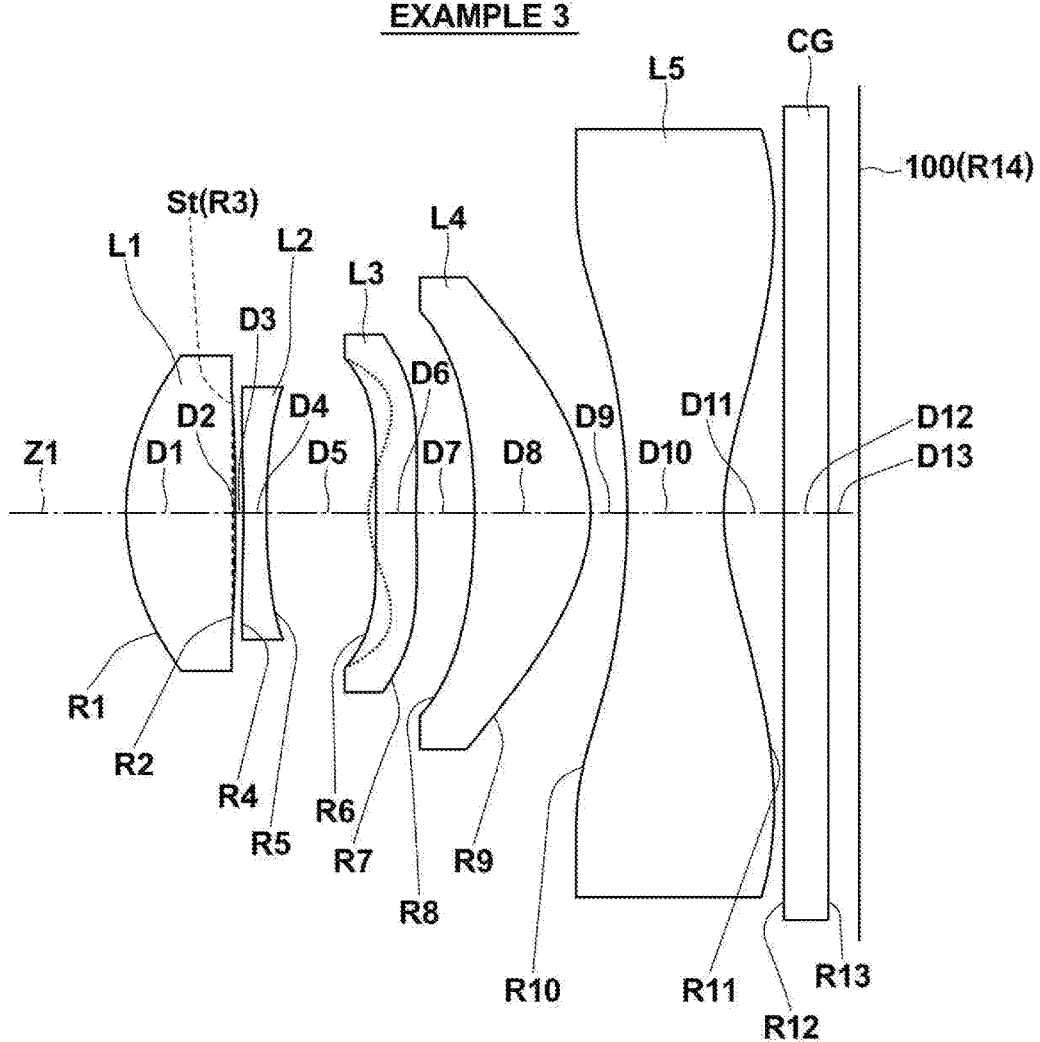
FIG. 3 is a sectional diagram that illustrates a third example of the configuration of an imaging lens according to an embodiment of the present invention, and corresponds to an imaging lens of Example 3.
Figure 4:
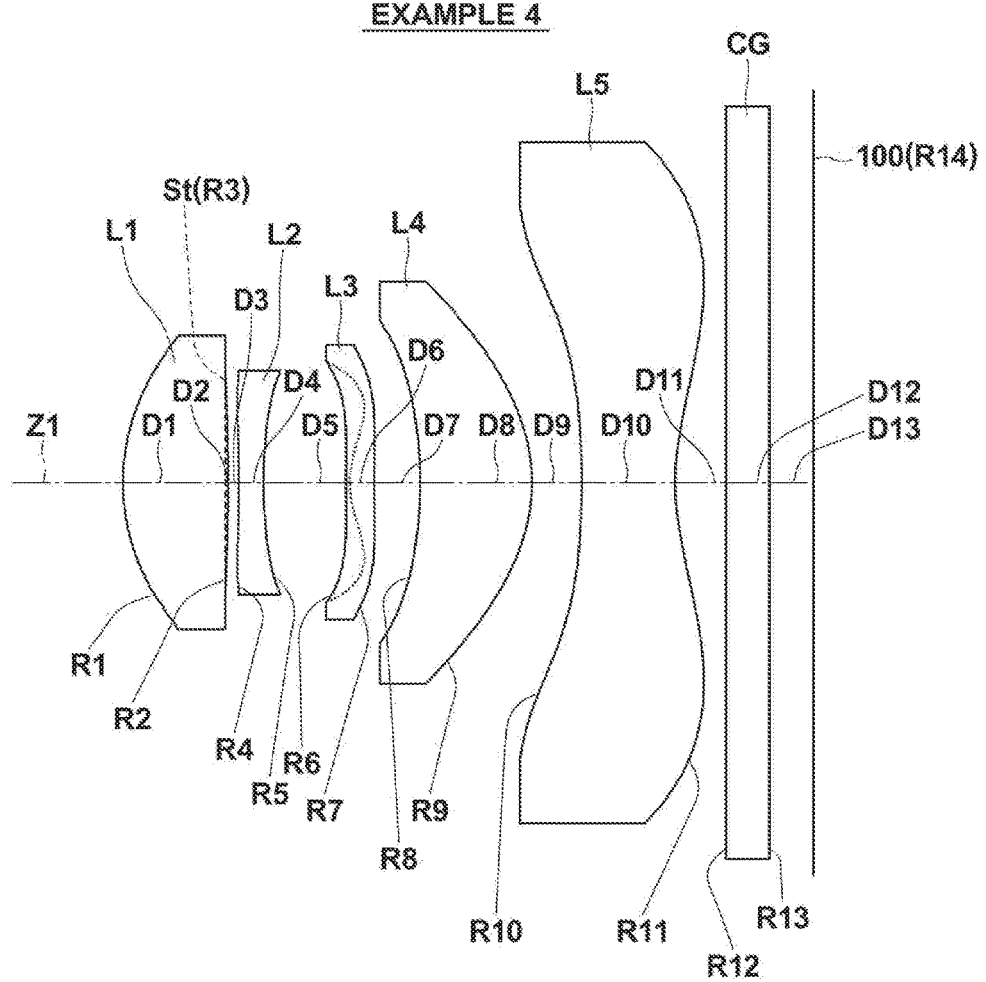
FIG. 4 is a sectional diagram that illustrates a fourth example of the configuration of an imaging lens according to an embodiment of the present invention, and corresponds to an imaging lens of Example 4.
Figure 5:
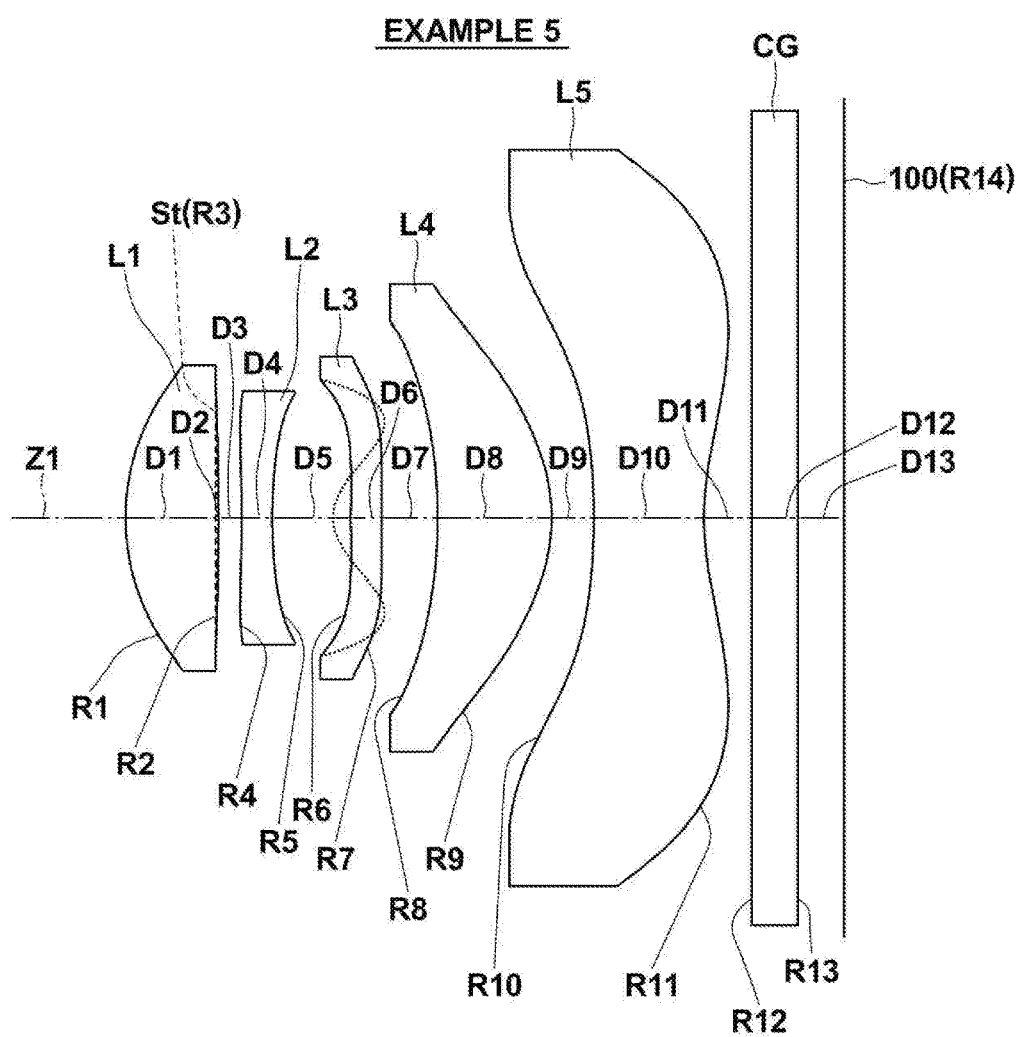
FIG. 5 is a sectional diagram that illustrates a fifth example of the configuration of an imaging lens according to an embodiment of the present invention, and corresponds to an imaging lens of Example 5.
Figure 6:
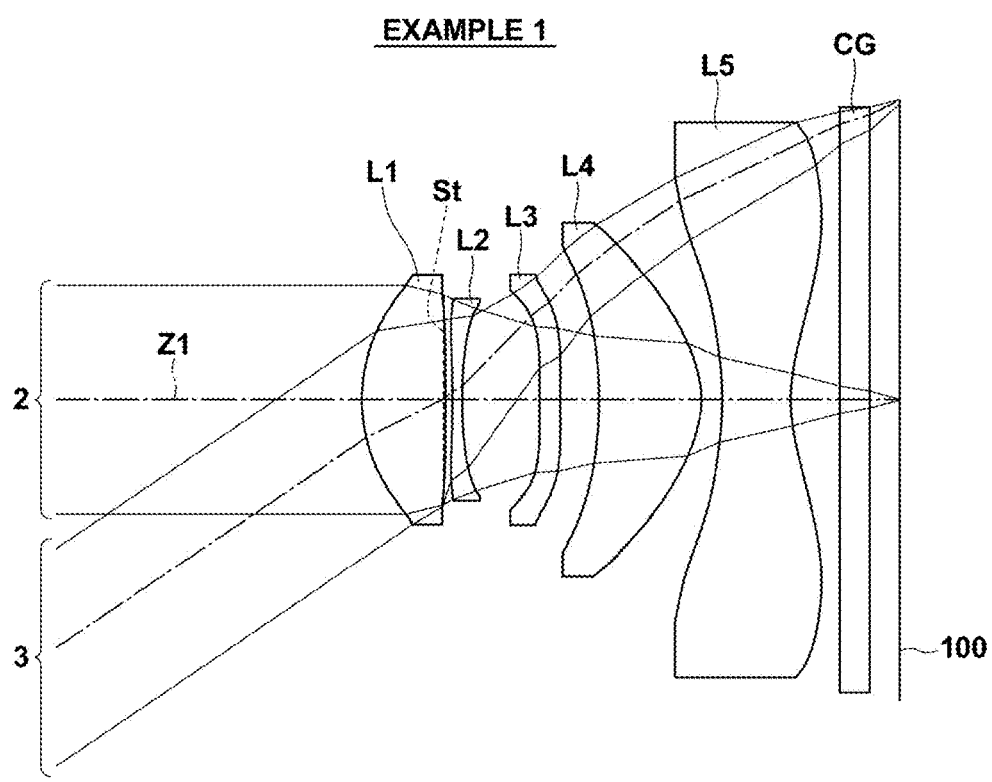
FIG. 6 is a ray diagram of the imaging lens shown in FIG. 1.

FIG. 1 shows the first example of the configuration of the imaging lens according to the first embodiment of the present invention. This example of the configuration corresponds to a lens configuration of a first Numerical Example (Tables 1 and 2) to be described later. Similarly, FIGS. 2 through 5 are sectional diagrams that illustrate second through fifth examples of the configurations of the imaging lenses according to the second through fifth embodiments, to be described later. The examples of FIGS. 2 through 5 correspond to the configurations of lenses of Numerical Examples (Tables 3 through 10). In FIGS. 1 through 5, the symbol Ri represents the radii of curvature of ith surfaces, i being lens surface numbers that sequentially increase from the object side to the image side, with the surface of a lens element most toward the object side designated as first. The symbol Di represents the distances between an ith surface and an i+1st surface along an optical axis Z1. Note that the basic configurations of the examples are the same, and therefore a description will be given of the example of the configuration of the imaging lens of FIG. 1 as a base, and the examples of FIGS. 2 through 5 will also be described as necessary. FIG. 6 is a ray diagram of the imaging lens shown in FIG. 1, illustrating an axial light flux 2 and a light flux 3 of a maximum angle of view exited from an object at an infinity distance.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal and a PDA. The imaging lens L is equipped with a first lens L1, a second lens L2, a third lens L3, a fourth lens L4, and a fifth lens L5 along the optical axis Z1, in this order from the object side.

Figure 12:
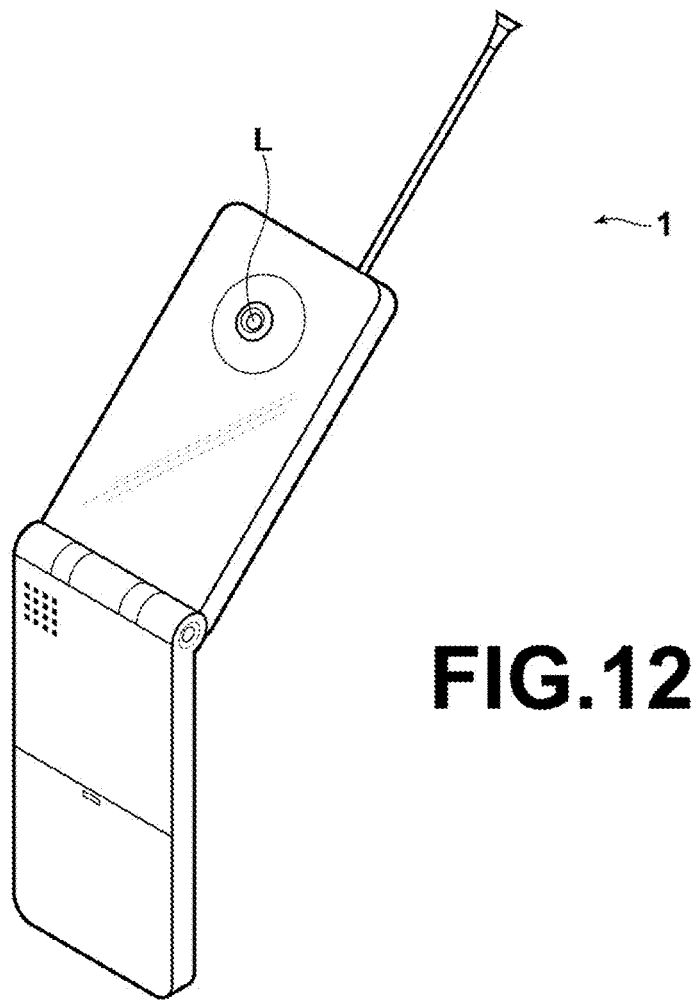
FIG. 12 is a diagram that illustrates a cellular telephone as an imaging apparatus equipped with the imaging lens of the present invention.

FIG. 12 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an imaging surface (image surface R14 in FIGS. 1 through 5) of the imaging lens L.

Figure 13:
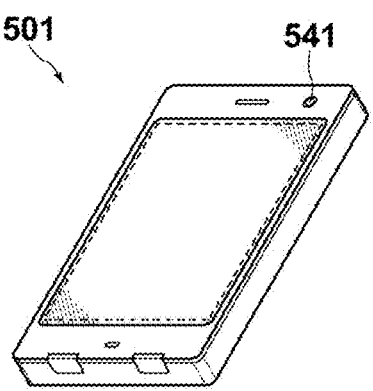
FIG. 13 is a diagram that illustrates a smart phone equipped with the imaging lens of the present invention.

FIG. 13 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an imaging surface (image surface R14 in FIGS. 1 through 5) of the imaging lens L.

Various optical members CG may be provided between the fifth lens L5 and the imaging element 100, depending on the configuration of the camera to which the lens is applied. A planar optical member such as a glass cover for protecting the imaging surface and infrared cutoff filters may be provided, for example. In this case, a planar cover glass having a coating having a filtering effect such as an infrared cutoff filter coating or an ND filter coating may be utilized as the optical member CG. Alternatively, materials having the same filtering effect may be employed.

Alternatively, the optical member CG may be omitted, and a coating may be administered on the fifth lens L5 to obtain the same effect as that of the optical member CG. In this case, the number of parts can be reduced, and the total length can be shortened.

It is preferable for the imaging lens L to be equipped with an aperture stop St provided more toward the object side than the object-side surface of the second lens L2 in the direction of the optical axis. By providing the aperture stop St more toward the object side than the object-side surface of the second lens L2, the incident angles of rays that pass through the optical system with respect to the imaging surface (imaging element) can be prevented from becoming excessively large, particularly at the peripheral portions of an imaging region.

In addition, it is preferable for the aperture stop St to be provided between the object-side surface of the first lens L1 and the object-side surface of the second lens L2 along the direction of the optical axis. By disposing the aperture stop St in such a manner, field curvature can be satisfactorily corrected while preventing the incident angles of rays that pass through the optical system with respect to the imaging surface (imaging element) from increasing at the peripheral portions of the imaging region.

Note that the aperture stop St "being provided more toward the object side than the object-side surface of the second lens in the direction of the optical axis" means that the position of the aperture stop along the direction of the optical axis is the same as or more toward the object side than the intersection of a marginal axial ray and the object-side surface of the second lens L2. In addition, the aperture stop St "being provided between the object-side surface of the first lens L1 and the object-side surface of the second lens L2 along the direction of the optical axis" means that the position of the aperture stop along the direction of the optical axis is the same as or more toward the image side than the intersection of a marginal axial ray and the object-side surface of the first lens L1 and that the position of the aperture stop along the direction of the optical axis is the same as or more toward the object side than the intersection of a marginal axial ray and the object-side surface of the second lens L2. In the present embodiment, the first through fifth examples of configurations of the lenses (FIG. 1 through FIG. 5) are those in which the aperture stop St is provided between the object-side surface of the first lens L1 and the object-side surface of the second lens L2. Note that the aperture stop St shown in each of FIGS. 1 through 6 does not necessarily represent the size or shape thereof, but the position thereof on the optical axis Z1.

In the imaging lens L, the first lens L1 has a positive refractive power in the vicinity of the optical axis. Therefore, the total length can be advantageously shortened. In addition, the first lens L1 has a biconvex shape in the vicinity of the optical axis. Thereby, spherical aberration can be satisfactorily corrected and the total length can be favorably shortened.

The second lens L2 has a negative refractive power in the vicinity of the optical axis. By the second lens L2 having negative refractive power in the vicinity of the optical axis, axial chromatic aberration can be favorably corrected. It is preferable for the second lens L2 to be of a biconcave shape. By providing the second lens L2 having a biconcave shape in the vicinity of the optical axis toward the image side of the first lens L1 having a biconvex shape in the vicinity of the optical axis, spherical aberration will be easily corrected. In addition, by the second lens L2 having a concave surface toward the image side, the rearward principal point in the second lens L2 can be positioned more toward the object side, and the total length can be favorably shortened.

The third lens L3 has a negative refractive power in the vicinity of the optical axis. This is advantageous from the viewpoint of correcting longitudinal chromatic aberration and lateral chromatic aberration. In addition, by the third lens L3 having a negative refractive power in the vicinity of the optical axis and having a shape which is convex toward the object side, longitudinal chromatic aberration can be satisfactorily corrected.

The fourth lens L4 has a positive refractive power in the vicinity of the optical axis. This can favorably reduce the total length of the imaging lens. It is preferable for the fourth lens L4 to be of a meniscus shape with a convex surface toward the image side. Thereby, the incident angle of rays that enter the object-side surface of the fourth lens L4 can be reduced and the occurrence of various aberrations can be suppressed. Accordingly, distortion, lateral chromatic aberration, and astigmatism, which are likely to occur accompanying the reduction of the total length of the imaging lens, can be satisfactorily corrected.

The fifth lens L5 has a negative refractive power in the vicinity of the optical axis. By disposing the fifth lens L5, which has a negative refractive power in the vicinity of the optical axis, most toward the image side of the imaging lens, the entire imaging lens can be of a telephoto type configuration and the total length thereof can be favorably reduced. It is preferable for the fifth lens L5 to be of a biconcave shape in the vicinity of the optical axis. In the case that the fifth lens L5 is made a biconcave shape in the vicinity of the optical axis, the refractive power of the fifth lens L5 can be sufficiently increased and the total length of the imaging lens can be favorably shortened while suppressing an excessive increase in the absolute values of curvatures of both surfaces of the fifth lens L5. In the case that the fifth lens L5 is made a biconcave shape in the vicinity of the optical axis, field curvature can be favorably corrected.

At least one of the object-side surface and the image-side surface of the fifth lens L5 has at least one inflection point. For example, the "inflection point" on the object-side surface of the fifth lens L5 refers to a point at which the shape of the object-side surface of the fifth lens L5 changes from a convex shape to a concave shape (or from a concave shape to a convex shape) with respect to the object side. The same applies to the "inflection point" on the image-side surface of the fifth lens L5. The position of the inflection point may be any arbitrary position in a radially outward direction from the optical axis within the effective diameter of the object-side surface and the image-side surface of the fifth lens L5. As shown in each of the Embodiments, by the fifth lens L5 being of a shape in which at least one of the object-side surface and the image-side surface of the fifth lens L5 has at least one inflection point, increases in the incident angles, at which rays that have passed through the optical system enter the imaging surface (imaging element), can be suppressed, particularly at the peripheral portions of the imaging region.

According to the above imaging lens L, the configuration of each lens element of the first lens L1 through the fifth lens L5 in a five lens configuration is optimized. Therefore, a lens system having a small F number and high imaging performance while having a shortened total length can be realized.

In the imaging lens L, it is preferable for at least one surface of each of the first lens L1 through the fifth lens L5 to be of an aspheric shape to have higher performance.

In addition, it is preferable for each of the first lens L1 through the fifth lens L5 that constitute the imaging lens L to be a single lens, not a cemented lens. For example, in a lens system equipped with a cemented lens constituted by lenses having materials, of which the linear expansion coefficients are different from each other, there is a possibility that aberrations will occur at a joint surface of the cemented lens due to the difference of the linear expansion coefficients due to changes in temperature. However, if the first lens L1 through the fifth lens L5 are single lenses, not cemented lenses, the occurrence of aberrations at the joint surface due to the difference of the linear expansion coefficients as described above can be suppressed. If all of the lenses are single lenses, a cementing process for cementing and a bonding agent will not be needed, thereby reducing the manufacturing cost. In addition, in the case that all of the lenses are single lenses, the number of the lens surfaces that contact with air will be greater than the case that any of the lenses are cemented lenses. Therefore, the degree of freedom in the design of each lens will increase, and a shortened total length, a small F number, and high resolution can be achieved.

Next, the operation and effects of conditional expressions related to the imaging lens L will be described in greater detail. Note that it is preferable for the imaging lens L to satisfy any one of conditional expressions, or arbitrary combinations thereof. It is preferable for the satisfied conditional expressions to be selected as appropriate, according to the items required of the imaging lens L.

First, it is preferable for the combined focal length f45 of the fourth lens L4 and the fifth lens L5 as well as the focal length of the entire system to satisfy conditional expression (1B) below:

$$f/f45<0 \quad (1B).$$

Conditional expression (1B) defines a preferred numerical range of the ratio of the focal length f of the entire system with respect to the combined focal length f45 of the fourth lens L4 and the fifth lens L5. In the imaging lens L, in the case that a lens group consisting of a first lens L1, a second lens L2, and a third lens L3 is designated as a front group and a lens group consisting of the fourth lens L4 and the fifth lens L5 is designated as a rear group, the imaging lens L which satisfies conditional expression (1B) will consist of the rear group having a negative refractive power and the front group having a positive refractive power and the imaging lens L will be of a telephoto type configuration as a whole. Therefore, the total length of the imaging lens can be shortened.

Advantageous effects related to conditional expression (1B) above can be obtained as well by satisfying the upper limit defined by conditional expression (1B-1) below and the upper limit defined by conditional expression (1B-2) below. Further, by suppressing the combined negative refractive power of the fourth lens L4 and the fifth lens L5 so as not to obtain the value of f/f45 not more than the lower limit defined by conditional expression (1B-1), there will be no need to excessively increase the positive refractive power of the front group and occurrence of high-order spherical aberration can be suppressed. Therefore, a shortened total length of the imaging lens and high resolution performance can be achieved. In order to increase the advantageous effects related to the lower limit defined by conditional expression (1B-1), it is preferable for the lower limit defined by conditional expression (1B-2) to be satisfied:

$$-2<f/f45<0 \quad (1B-1)$$

$$-1<f/f45<0 \quad (1B-2).$$

It is preferable for the combined focal length f45 of the fourth lens L4 and the fifth lens L5, and the focal length f of the entire system to satisfy conditional expression (1A) below:

$$-0.38<f/f45<-0.01 \quad (1A).$$

By suppressing the combined negative refractive power of the fourth lens L4 and the fifth lens L5 so as not to obtain the value of f/f45 not more than the lower limit defined by conditional expression (1A), there will be no need to excessively increase the positive refractive power of the front group and occurrence of high-order spherical aberration can be suppressed more preferably than the case that the lower limit defined by conditional expression (1B-1) and the lower limit defined by conditional expression (1B-2) are satisfied. Therefore, a shortened total length of the imaging lens and high resolution performance can be preferably achieved. In addition, by securing the combined negative refractive power of the fourth lens L4 and the fifth lens L5 so as not to obtain the value of f/f45 not less than the upper limit defined by conditional expression (1A), the total length of the imaging lens can be advantageously shortened. In order to further increase the advantageous effects related to conditional expression (1A), it is more preferable for conditional expression (1A-1) to be satisfied, and even more preferable for conditional expression (1A-2) to be satisfied:

$$-0.27 < f/f45 < -0.015 \quad (1A-1)$$

$$-0.25 < f/f45 < -0.02 \quad (1A-2).$$

It is preferable for the paraxial radius of curvature R2f of the object-side surface of the second lens L2 and the paraxial radius of curvature R2r of the image-side surface of the second lens L2 to satisfy conditional expression (2) below:

$$1.7 < (R2f - R2r)/(R2f + R2r) \quad (2).$$

Conditional expression (2) defines a preferred numerical range related to the paraxial radius of curvature R2f of the object-side surface of the second lens L2 and the paraxial radius of curvature R2r of the image-side surface of the second lens L2. By respectively setting the paraxial radii of curvature of the object side surface and the image-side surface of the second lens L2 so as not to obtain the value of (R2f−R2r)/(R2f+R2r) not more than the lower limit defined by conditional expression (2), astigmatism can be preferably corrected. Advantageous effects related to the aforementioned conditional expression (2) can be obtained as well by satisfying the lower limit defined by conditional expression (2-1) below. In order to further increase the advantageous effects, it is preferable for the lower limit defined by conditional expression (2-2). In addition, by respectively setting the paraxial radii of curvature of the object-side surface and the image-side surface of the second lens L2 so as not to obtain the value of (R2f−R2r)/(R2f+R2r) not less than the upper limit defined by conditional expression (2), the total length of the imaging lens can be preferably shortened. In order to further increase the advantageous effects related to the upper limit defined by conditional expression (2-1), it is preferable for the upper limit defined by conditional expression (2-2):

$$1.7 < (R2f - R2r)/(R2f + R2r) < 4 \quad (2-1)$$

$$1.8 < (R2f - R2r)/(R2f + R2r) < 3.5 \quad (2-2).$$

It is preferable for the focal length f4 of the fourth lens and the focal length f of the entire system to satisfy conditional expression (3) below:

$$0 < f/f4 < 1.9 \quad (3).$$

Conditional expression (3) defines a preferred numerical range of the ratio of the focal length f of the entire system with respect to the focal length f4 of the fourth lens L4. By securing the refractive power of the fourth lens L4 so as not to obtain the value of f/f4 not more than the lower limit defined by conditional expression (3), the incident angle of rays that pass through the imaging system with respect to the imaging surface (imaging element) particularly at the medium angle of view can be more preferably suppressed from excessively increasing. Furthermore, distortion and lateral chromatic aberration can be preferably corrected. By suppressing the refractive power of the fourth lens L4 so as not to obtain the value of f/f4 not less than the upper limit defined by conditional expression (3), the positive refractive power of the fourth lens L4 will not be excessively increased with respect to the refractive power of the entire system. Further, spherical aberration and astigmatism can be preferably corrected. In order to further increase the aforementioned advantageous effects related to the upper limit defined by conditional expression (3), it is more preferable for the upper limit defined by conditional expression (3-1) to be satisfied, and even more preferable for the upper limit defined by conditional expression (3-2) to be satisfied:

$$0 < f/f4 < 1.8 \quad (3-1)$$

$$0 < f/f4 < 1.75 \quad (3-2).$$

Here, two preferred examples of configurations in the imaging lens L and advantageous effects thereof will be described. Note that both of the two preferred examples of configurations can adopt the aforementioned preferred configurations of the imaging lens L as appropriate.

First, in the first example of a configuration of the imaging lens L, the imaging lens L substantially consists of five lenses which are a first lens L1 of being a biconvex shape, a second lens L2 having a negative refractive power, a third lens L3 having a negative refractive power and a convex surface that faces the object side, a fourth lens L4 having a positive refractive power, and a fifth lens L5 having a negative refractive power, of which at least one of the object-side surface and the image-side surface has at least one inflection point, in this order from the object side; and conditional expression (1A) is satisfied. According to the first example of configuration, high-order spherical aberrations can be favorably suppressed from occurring in particular, which is advantageous from the viewpoint of achieving a small F number. Furthermore, the total length of the imaging lens can be shortened and high imaging performance can be realized.

In the second example of a configuration of the imaging lens L, the imaging lens L substantially consists of five lenses which are a first lens L1 of being a biconvex shape, a second lens L2 having a negative refractive power, a third lens L3 having a negative refractive power with a convex surface that faces the object side, a fourth lens L4 having a positive refractive power, and a fifth lens L5 being of a biconcave shape, of which at least one of the object-side surface and the image-side surface has at least one inflection point in this order from the object side; and conditional expression (1B) is satisfied. According to the second example of configuration, the total length of the imaging lens can be advantageously shortened, a small F number and high imaging performance can be achieved while correcting field curvature in particular.

As described above, in the imaging lenses L according to the embodiments of the present invention, the configuration of each lens element in a five lens configuration is optimized, and all of the lenses are single lenses. Therefore, a lens system having a small F number and high imaging resolution can be realized while shortening the total length of the imaging lens. The imaging lens L according to the embodiments of the present invention can have a small F number of 2.3 or lower, and can be favorably applied for use in cellular telephones, smart phones, and tablet type terminals. In contrast, the F numbers of the imaging lenses disclosed in Patent Documents 1 and 2 are too large, being 2.5 or greater and it is difficult for the imaging lens to be compatible with imaging elements that can be adaptive to an increase in numbers of pixels. As an example, in the recent imaging elements in which miniaturization of the pixel size has been advanced, the amount of light that enters one pixel is decreased. Therefore, the imaging lenses having large F numbers disclosed in Patent Documents 1 and 2 have a problem that the amount of entering light will become insufficient when the imaging lenses are applied for use in the imaging elements adaptive to the increase in the numbers of pixels.

In addition, in the case that each of the lens configurations of the first lens L1 through the fifth lens L5 in the aforementioned imaging lens L is set such that the full angle of view is 68° or greater in the same manner as the imaging lenses according to the first to the fifth embodiments, for example; the following demands can be responded to: the imaging lens L can be favorably applied for use in cellular phone terminals and the like, images photographed with high resolution from a wide angle of view can be obtained, and a desired image portion of the photographed images can be enlarged and obtained.

Further improved imaging performance can be realized by satisfying preferred conditions appropriately in the imaging lens according to the embodiments of the present invention. In addition, the imaging apparatuses according to the embodiments of the present invention output image signals corresponding to optical images formed by the high performance imaging lenses according to the embodiments of the present invention. Therefore, high resolution photographed images be obtained while reducing the size of the apparatus.

Next, specific examples of numerical values of the imaging lens according to the embodiments of the present invention will be described. A plurality of examples of numerical values will be summarized and explained below.

Table 1 and Table 2 below show specific lens data corresponding to the configuration of the imaging lens illustrated in FIG. 1. Particularly, Table 1 shows basic lens data of the imaging lens, and Table 2 shows data related to aspherical surfaces. In the lens data of Table 1, ith lens surface numbers that sequentially increase from the object side to the image side, with the lens surface at the most object side designated as first, are shown in the column of surface number Si. The radii of curvature (mm) of ith surfaces from the object side corresponding to the symbols Ri illustrated in FIG. 1 are shown in the column of radius of curvature Ri. The distances between an ith surface and an i+1st surface along the optical axis are shown in the column of distances between surfaces Di. The refractive indices of jth optical elements from the object side to the image side with respect to the d line (wavelength: 587.6 nm) are shown in the column Ndj. The Abbe's numbers of the jth optical element with respect to the d line are shown in the column vdj.

An aperture stop St and the optical member CG are also shown in Table 1. In Table 1, the column of the surface number of a surface corresponding to the aperture stop St indicates a surface number and the letters (St), and the column of the surface number of a surface corresponding to the image surface indicates a surface number and the letters (IMG). The sign of the radius of curvature is positive in the case that a surface shape is convex on the object side, and negative in the case that the surface shape is convex on the image side. The values of the focal length f (mm) of the entire system, the back focus Bf (mm), the F number Fno., and the full angle of view 2ω (°) are shown as data for each lens datum in the upper and outside portion of each Table. Note that the back focus Bf is represented as air converted values.

In the basic lens data of Table 1, an asterisk mark * is attached to the surface number of each of aspheric surfaces. In the imaging lens of Example 1, both surfaces of each of the first lens L1 through the fifth lens L5 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as abase is to be multiplied by the numerical value in front of "E". For example, "1.0E-02" indicates that the numerical value is "1.0×10$^{-2}$". Note that in Table 2, the mark "-" is shown in columns with no values.

The values of coefficients An and KA represented by the aspherical surface shape formula (A) below are shown as the aspherical surface data. In greater detail, Z is the length (mm) of a normal line that extends from a point on the aspherical surface having a height h from the optical axis to a plane (a plane perpendicular to the optical axis) that contacts the peak of the aspherical surface.

$$Z = C \cdot h^2 / \{1 + (1 - KA \cdot C^2 \cdot h^2)^{1/2}\} + \Sigma An \cdot h^n \qquad (A)$$

where,

Z: the depth of the aspherical surface (mm), h: the distance from the optical axis to the surface of the lens (height) (mm), C: the paraxial curvature=1/R (R: the paraxial radius of curvature), An: an nth ordinal aspherical surface coefficient (n is an integer 3 or greater), and K: an aspherical surface coefficient.

Specific lens data corresponding to the configurations of the imaging lenses illustrated in FIG. 2 through FIG. 5 are shown in Table 3 through Table 10 as Example 2 through Example 5 in the same manner as that for the imaging lens of Example 1. In the imaging lenses of Examples 1 through 5, both of the surfaces of the first lens L1 through the fifth lens L5 are all aspherical surfaces.

Figure 7:
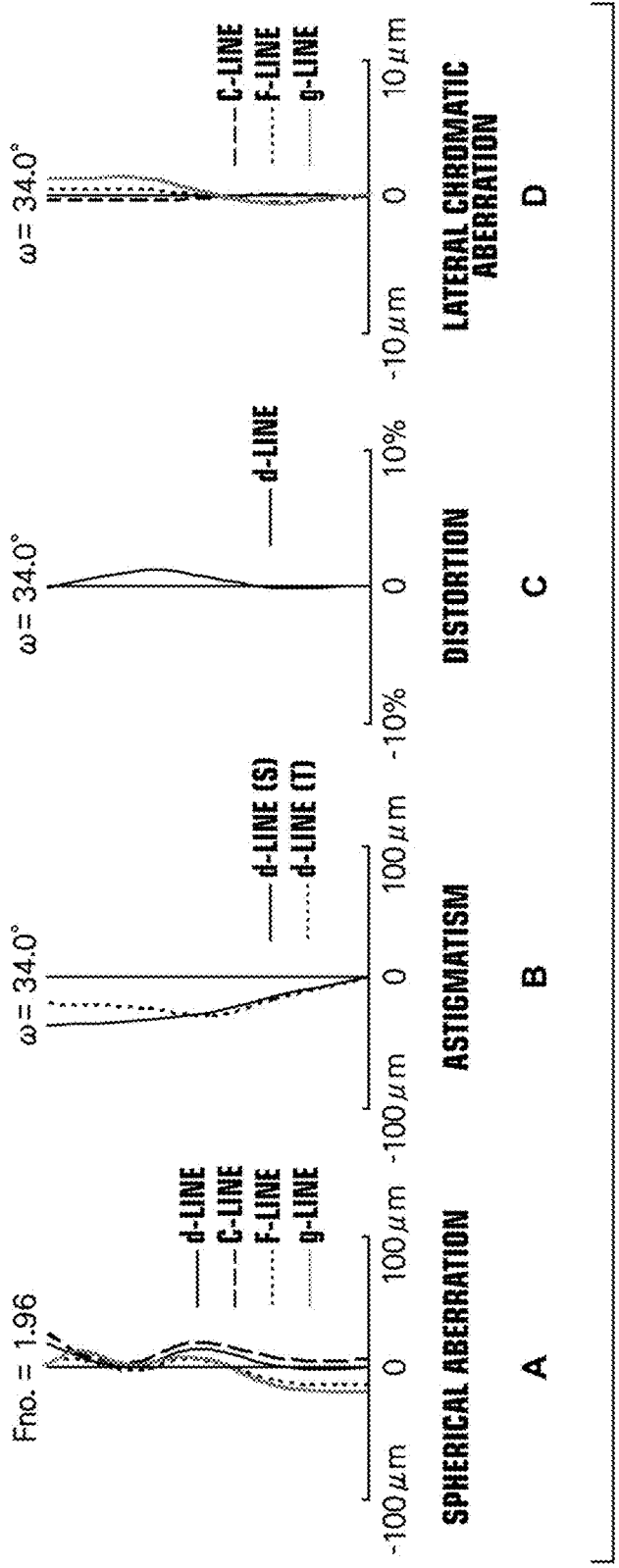
FIG. 7 is a collection of diagrams that illustrate aberrations of the imaging lens of Example 1, wherein A illustrates spherical aberration, B illustrates astigmatism, C illustrates distortion, and D illustrates lateral chromatic aberration.

A through D of FIG. 7 respectively show spherical aberration, astigmatism, distortion, and lateral chromatic aberration. Each of the diagrams illustrates the spherical aberration, the astigmatism, and the distortion illustrate aberrations using the d line (wavelength: 587.6 nm) as a standard wavelength. The diagrams that illustrate spherical aberration and lateral chromatic aberration, also show aberrations related to the F line (wavelength: 486.1 nm), the C line (wavelength: 656.3 nm), and the g line (wavelength: 435.8 nm). In the diagrams that illustrate astigmatism, aberrations in the sagittal direction (S) are indicated by solid lines, while aberrations in the tangential direction (T) are indicated by broken lines. In addition, "Fno." denotes F numbers, and "ω" denotes half angles of view.

Figure 8:
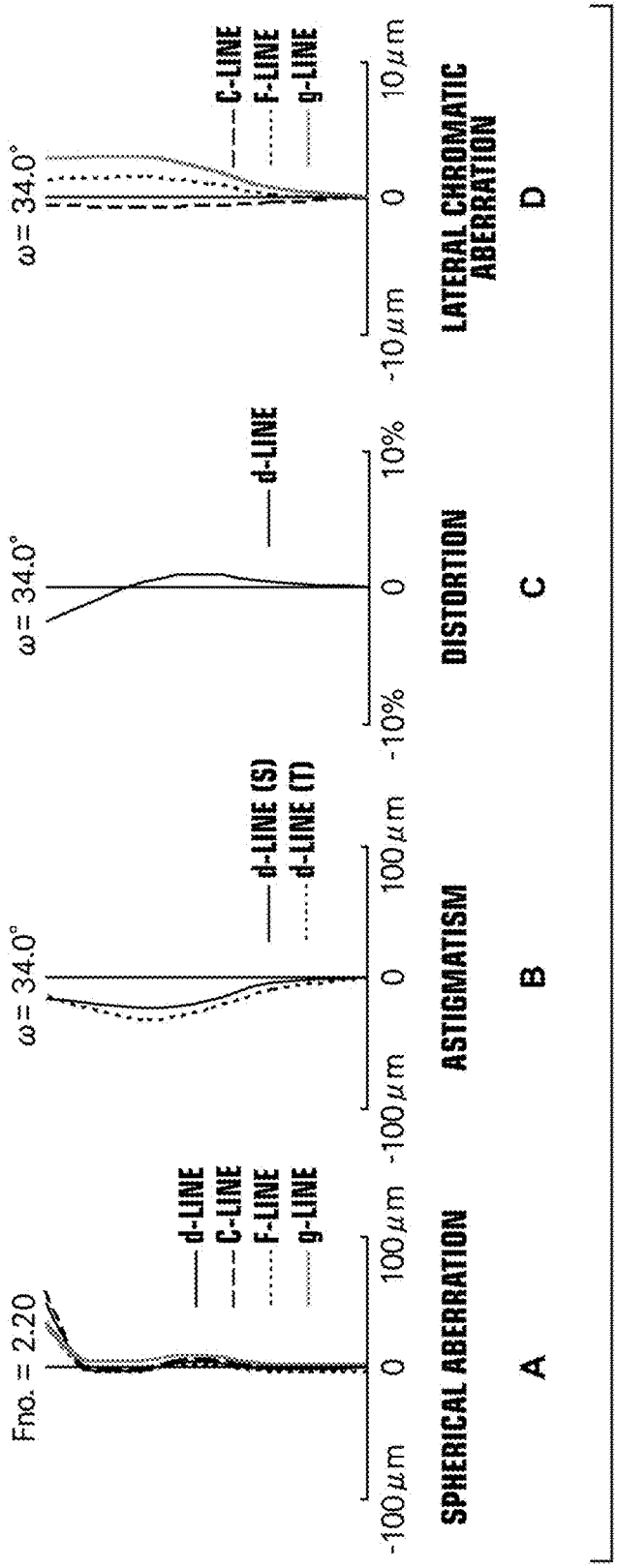
FIG. 8 is a collection of diagrams that illustrate aberrations of the imaging lens of Example 2, wherein A illustrates spherical aberration, B illustrates astigmatism, C illustrates distortion, and D illustrates lateral chromatic aberration.
Figure 9:
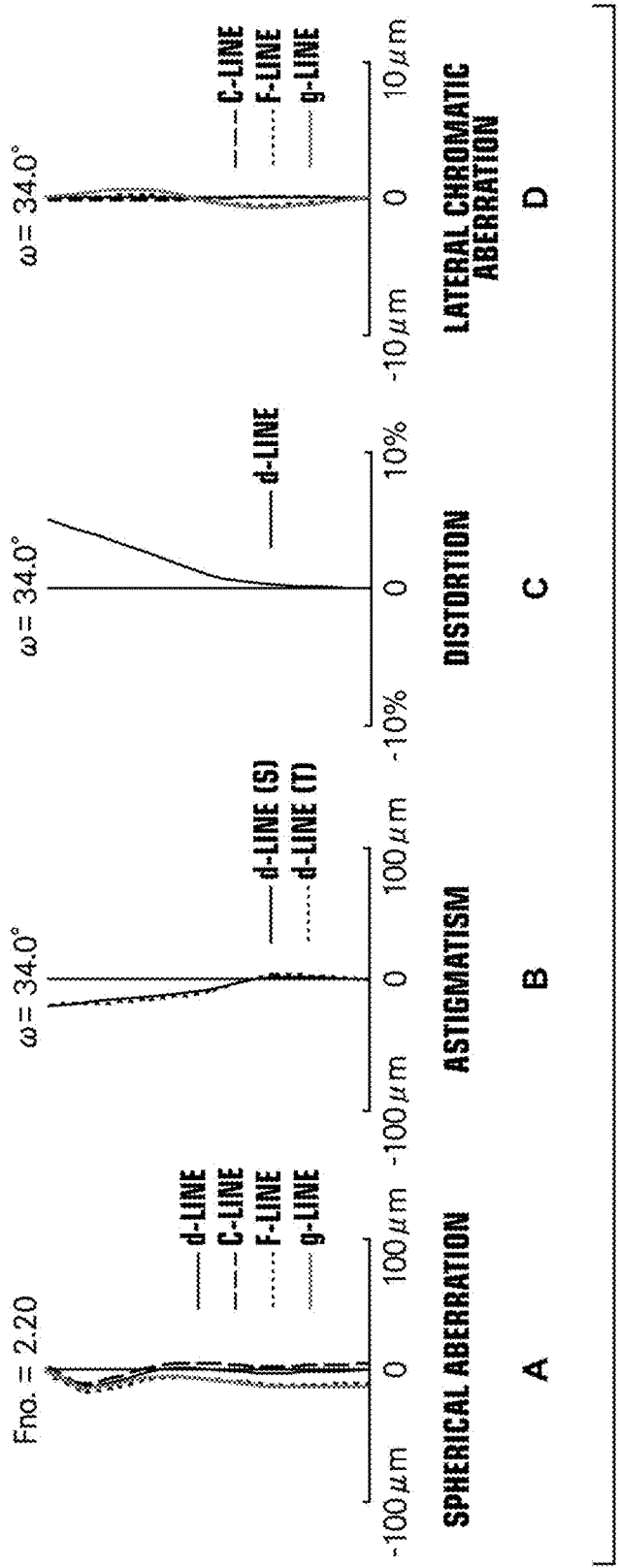
FIG. 9 is a collection of diagrams that illustrate aberrations of the imaging lens of Example 3, wherein A illustrates spherical aberration, B illustrates astigmatism, C illustrates distortion, and D illustrates lateral chromatic aberration.
Figure 10:
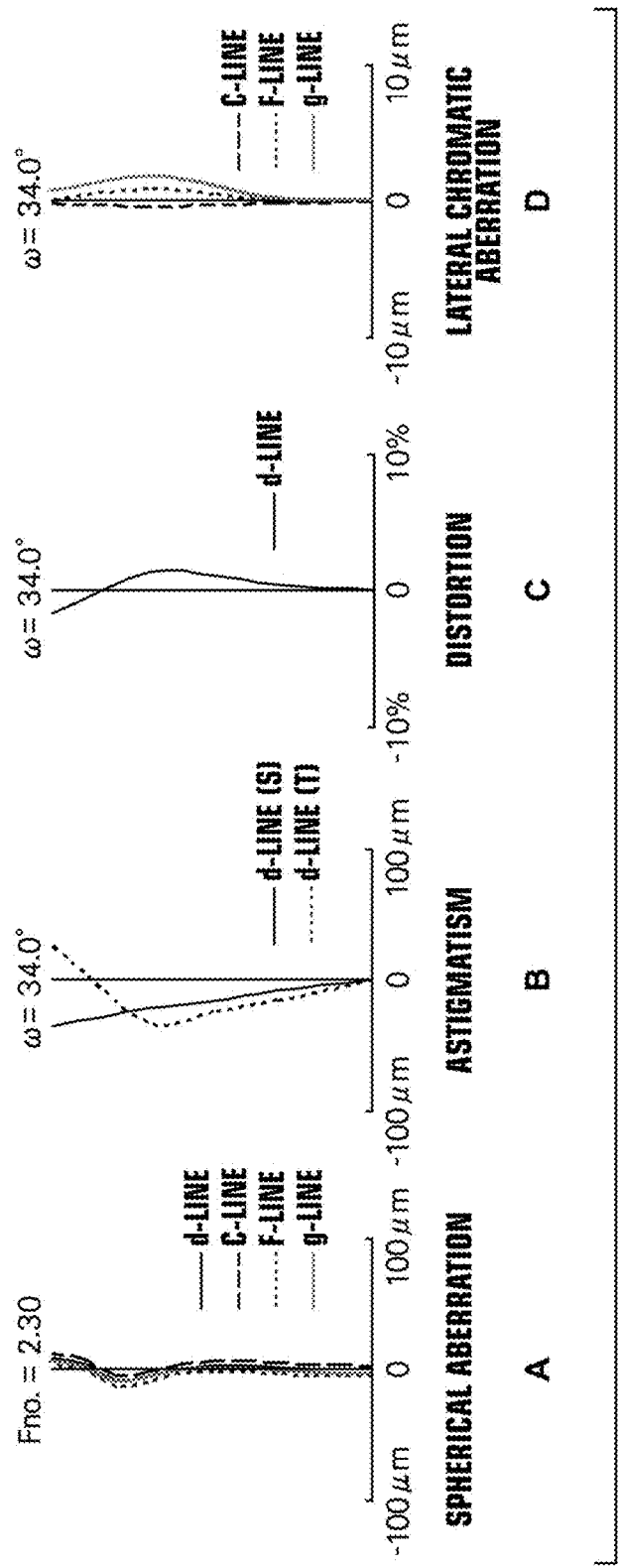
FIG. 10 is a collection of diagrams that illustrate aberrations of the imaging lens of Example 4, wherein A illustrates spherical aberration, B illustrates astigmatism, C illustrates distortion, and D illustrates lateral chromatic aberration.
Figure 11:
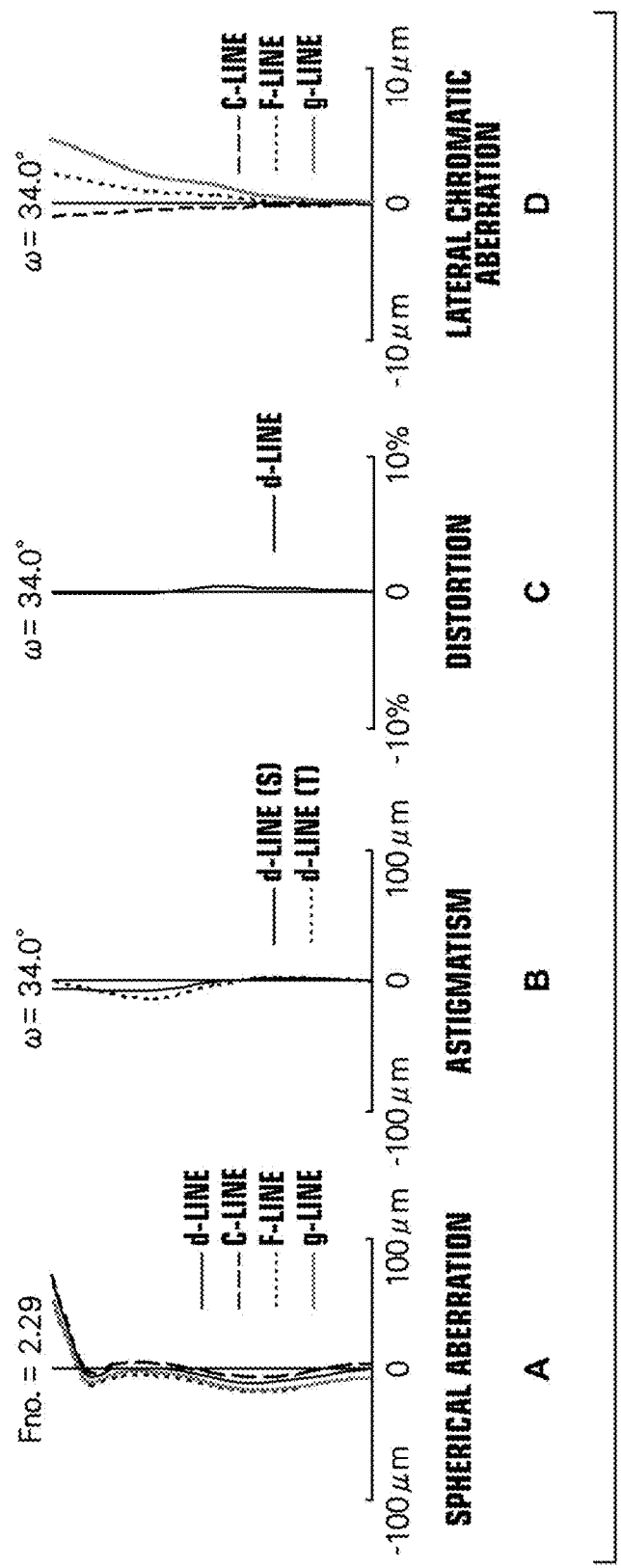
FIG. 11 is a collection of diagrams that illustrate aberrations of the imaging lens of Example 5, wherein A illustrates spherical aberration, B illustrates astigmatism, C illustrates distortion, and D illustrates lateral chromatic aberration.

Similarly, A through D of FIG. 8 to A through D of FIG. 11 show various aberrations with respect to the imaging lenses of Example 2 through Example 5. The aberration diagrams shown in A through D of FIG. 7 to A through D of FIG. 11 are all for when the object distance is at infinity.

Table 11 shows values corresponding to conditional expressions (1A), (1B), (2), and (3) described above with respect to Examples 1 through 5, respectively.

As can be understood from each set of numerical value data and from the diagrams that illustrate aberrations, each of the imaging lenses of the Examples realizes high imaging performance from a central angle of view through peripheral angles of view while having a short total length in which a F number falls within the range from 1.9 to 2.3 and various aberrations are favorably corrected.

The imaging lens of the present invention is not limited to the embodiments and the examples described above, and various modifications are possible. For example, values, such as the radius of curvature, the distances between surfaces, the refractive indices, the Abbe numbers, aspheric surface coefficients of each lens, and the like are not limited to the values in the numerical examples shown in the Tables, but may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 4.451, Bf = 0.994, Fno. = 1.96, 2ω = 68.0

| Si | Ri | Di | Ndj | νdj |
|---|---|---|---|---|
| *1 | 1.65665 | 0.839 | 1.54400 | 55.90 |
| *2 | −47.32089 | −0.019 | | |
| 3 (St) | ∞ | 0.087 | | |
| *4 | −13.38830 | 0.100 | 1.63400 | 23.80 |
| *5 | 4.93954 | 0.776 | | |
| *6 | 26.95105 | 0.209 | 1.63400 | 23.80 |
| *7 | 23.47085 | 0.389 | | |
| *8 | −4.17061 | 1.035 | 1.54400 | 55.90 |

TABLE 1-continued

Example 1
f = 4.451, Bf = 0.994, Fno. = 1.96, 2ω = 68.0

| Si | Ri | Di | Ndj | νdj |
|---|---|---|---|---|
| *9 | −1.00713 | 0.208 | | |
| *10 | −2.94055 | 0.687 | 1.53500 | 56.30 |
| *11 | 1.59689 | 0.495 | | |
| 12 | ∞ | 0.300 | 1.51700 | 64.20 |
| 13 | ∞ | 0.301 | | |
| 14 (IMG) | ∞ | | | |

TABLE 2

Example 1

| | Surface Numbers | | | | |
|---|---|---|---|---|---|
| | 1 | 2 | 4 | 5 | 6 |
| KA | −3.7976870E+00 | −1.2134660E+03 | −7.4649370E+01 | 1.2447890E+01 | 3.0836140E+02 |
| A4 | 1.3832817E−01 | −1.5876173E−02 | 1.1985700E−02 | 3.7603022E−02 | −1.6412865E−01 |
| A6 | −7.3748905E−02 | 1.5137348E−02 | 1.9578733E−02 | 7.6904243E−03 | −8.8040488E−02 |
| A8 | 5.7126530E−02 | −4.6555735E−02 | 7.1402359E−02 | 5.4322775E−02 | 6.9767261E−02 |
| A10 | −2.5895056E−02 | 7.5895327E−02 | −1.7002689E−01 | −7.7677902E−02 | −7.3604102E−02 |
| A12 | 4.5255609E−03 | −6.4561181E−02 | 1.6539693E−01 | 6.1025615E−02 | 3.5468540E−02 |
| A14 | −2.2298263E−03 | 1.9380048E−02 | −5.2214751E−02 | −9.9424425E−04 | — |

| | Surface Numbers | | | | |
|---|---|---|---|---|---|
| | 7 | 8 | 9 | 10 | 11 |
| KA | −8.4478570E+02 | 6.1690520E+00 | −3.1780190E+00 | −5.5012950E+01 | −7.2659060E+00 |
| A4 | −1.1838563E−01 | −3.0722349E−03 | −9.2159204E−02 | −3.3028471E−02 | −2.5853121E−02 |
| A6 | −5.2104892E−02 | 2.2778262E−02 | 5.8260595E−02 | −2.5068192E−03 | 6.7664928E−03 |
| A8 | 3.1117360E−02 | −5.6529843E−02 | −3.4625207E−02 | 3.5530638E−03 | −2.0450733E−03 |
| A10 | −8.9863103E−03 | 5.1556213E−02 | 1.2055852E−02 | −3.1971507E−04 | 3.3838200E−04 |
| A12 | 7.7060939E−03 | −2.0007615E−02 | −1.8131394E−03 | −4.4335886E−05 | −2.4154017E−05 |
| A14 | — | 2.9253979E−03 | 5.3694997E−05 | 4.9296999E−06 | 4.5795907E−07 |

TABLE 3

Example 2
f = 4.291, Bf = 1.058, Fno. = 2.20, 2ω = 68.0

| Si | Ri | Di | Ndj | νdj |
|---|---|---|---|---|
| *1 | 1.44500 | 0.745 | 1.54400 | 55.90 |
| *2 | −12.15716 | −0.017 | | |
| 3 (St) | ∞ | 0.096 | | |
| *4 | −9.52867 | 0.139 | 1.63400 | 23.80 |
| *5 | 3.23770 | 0.549 | | |
| *6 | 11.93721 | 0.179 | 1.63400 | 23.80 |
| *7 | 10.81758 | 0.409 | | |
| *8 | −3.39001 | 0.781 | 1.54400 | 55.90 |
| *9 | −1.11273 | 0.282 | | |
| *10 | −4.01045 | 0.580 | 1.53500 | 56.30 |
| *11 | 1.86356 | 0.457 | | |
| 12 | ∞ | 0.300 | 1.51700 | 64.20 |
| 13 | ∞ | 0.403 | | |
| 14 (IMG) | ∞ | | | |

TABLE 4

Example 2

| | Surface Numbers | | | | |
|---|---|---|---|---|---|
| | 1 | 2 | 4 | 5 | 6 |
| KA | −3.8012600E+00 | −7.8632640E+02 | −1.6323250E+02 | −7.6062060E+00 | −8.6784140E+02 |
| A4 | 2.1063101E−01 | −8.9429150E−03 | 3.1988070E−02 | 6.2270148E−02 | −2.6870162E−01 |

TABLE 4-continued

Example 2

| | | | | | |
|---|---|---|---|---|---|
| A6 | −1.6197388E−01 | 3.7967568E−02 | 3.4586715E−02 | 5.1859634E−02 | −1.7773117E−01 |
| A8 | 1.6608089E−01 | −1.4456253E−01 | 1.8422717E−01 | 1.6489980E−01 | 2.1408084E−01 |
| A10 | −9.7000722E−02 | 2.9229107E−01 | −6.2121810E−01 | −3.0432015E−01 | −2.5776117E−01 |
| A12 | 2.3475593E−02 | −3.1855376E−01 | 8.3484807E−01 | 2.2550255E−01 | 1.9905442E−01 |
| A14 | −1.3026942E−02 | 1.4249499E−01 | −3.8784477E−01 | −6.0428287E−02 | 6.1949683E−03 |
| A16 | 2.7040941E−03 | −1.4059531E−02 | 1.2226571E−02 | 1.4154798E−01 | −2.8610599E−02 |

| | Surface Numbers | | | | |
|---|---|---|---|---|---|
| | 7 | 8 | 9 | 10 | 11 |
| KA | −5.8017730E+02 | 5.8710180E+00 | −3.1612100E+00 | −1.8402890E+01 | −1.0618280E+01 |
| A4 | −2.1293802E−01 | −1.0110948E−03 | −1.3666935E−01 | −6.1478923E−02 | −6.0337544E−02 |
| A6 | −9.3380452E−02 | 3.3114691E−02 | 1.1554843E−01 | −7.0679986E−03 | 1.7634257E−02 |
| A8 | 1.0968293E−01 | −1.5096235E−01 | −9.9156376E−02 | 1.0749195E−02 | −5.8702738E−03 |
| A10 | −2.4329411E−02 | 2.0086798E−01 | 4.7450542E−02 | −1.1183943E−03 | 1.1799303E−03 |
| A12 | 3.3999086E−02 | −1.0433334E−01 | −8.3384056E−03 | −2.1266964E−04 | −1.2373131E−04 |
| A14 | −1.7183898E−03 | 1.9219898E−02 | 1.0286780E−04 | 1.5348619E−05 | 4.5077633E−06 |
| A16 | −5.8991946E−04 | 4.4010324E−04 | −2.8108462E−05 | 3.0090091E−06 | 1.3882324E−07 |

TABLE 5

Example 3
$f = 3.936$, $Bf = 0.803$, $Fno. = 2.20$, $2\omega = 68.0$

| Si | Ri | Di | Ndj | vdj |
|---|---|---|---|---|
| *1 | 1.59880 | 0.732 | 1.54400 | 55.90 |
| *2 | −15.73330 | −0.019 | | |
| 3 (St) | ∞ | 0.072 | | |
| *4 | −11.90130 | 0.153 | 1.63400 | 23.80 |
| *5 | 4.87313 | 0.728 | | |
| *6 | 29.71108 | 0.267 | 1.63400 | 23.80 |
| *7 | 15.56135 | 0.386 | | |
| *8 | −4.01211 | 0.777 | 1.54400 | 55.90 |
| *9 | −1.01578 | 0.242 | | |
| *10 | −4.15704 | 0.639 | 1.53500 | 56.30 |
| *11 | 1.40391 | 0.400 | | |
| 12 | ∞ | 0.300 | 1.51700 | 64.20 |
| 13 | ∞ | 0.206 | | |
| 14 (IMG) | ∞ | | | |

TABLE 6

Example 3

| | Surface Numbers | | | | |
|---|---|---|---|---|---|
| | 1 | 2 | 4 | 5 | 6 |
| KA | −3.3816170E+00 | −4.4058280E+02 | −2.0026930E+02 | 1.3068360E+01 | 4.2970460E+02 |
| A4 | 1.4122919E−01 | −1.7127680E−02 | 1.3169831E−02 | 3.8616711E−02 | −1.6154707E−01 |
| A6 | −7.4477192E−02 | 1.4123872E−02 | 2.1940212E−02 | 8.9732439E−03 | −7.6917399E−02 |
| A8 | 5.4590515E−02 | −4.9259127E−02 | 7.4104433E−02 | 5.7626947E−02 | 6.7839125E−02 |
| A10 | −2.7885171E−02 | 7.1883772E−02 | −1.6774731E−01 | −7.2966385E−02 | −7.5061236E−02 |
| A12 | 2.4476074E−03 | −6.8151810E−02 | 1.6544316E−01 | 6.6088361E−02 | 3.6278800E−02 |
| A14 | −5.0061287E−03 | 1.9602446E−02 | −5.6931889E−02 | 1.2061432E−03 | 0.0000000E+00 |
| A16 | 0.0000000E+00 | 0.0000000E+00 | 0.0000000E+00 | 0.0000000E+00 | 0.0000000E+00 |

| | Surface Numbers | | | | |
|---|---|---|---|---|---|
| | 7 | 8 | 9 | 10 | 11 |
| KA | −1.0109900E+02 | 7.6505930E+00 | −2.8234240E+00 | −4.9383610E+01 | −7.4598790E+00 |
| A4 | −1.1669692E−01 | −6.9529536E−04 | −8.8310794E−02 | −2.8008427E−02 | −2.7658921E−02 |
| A6 | −5.2720979E−02 | 1.3388608E−02 | 5.9413377E−02 | −2.4369591E−03 | 7.8991709E−03 |
| A8 | 3.0356933E−02 | −5.8532820E−02 | −3.4655529E−02 | 3.5533289E−03 | −2.1312039E−03 |
| A10 | −1.0407101E−02 | 5.1908415E−02 | 1.2030685E−02 | −3.2022476E−04 | 3.3069609E−04 |
| A12 | 6.7949244E−03 | −1.9657374E−02 | −1.8006271E−03 | −4.4595324E−05 | −2.4156713E−05 |
| A14 | 0.0000000E+00 | 3.0054623E−03 | 6.6474101E−05 | 4.8603428E−06 | 5.5636876E−07 |
| A16 | 0.0000000E+00 | 0.0000000E+00 | 0.0000000E+00 | 0.0000000E+00 | 0.0000000E+00 |

TABLE 7

Example 4
f = 3.987, Bf = 0.846, Fno. = 2.30, 2ω = 68.0

| Si | Ri | Di | Ndj | νdj |
|---|---|---|---|---|
| *1 | 1.44433 | 0.722 | 1.54400 | 55.90 |
| *2 | −11.53962 | −0.017 | | |
| 3 (St) | ∞ | 0.089 | | |
| *4 | −11.74928 | 0.170 | 1.63400 | 23.80 |
| *5 | 3.40094 | 0.564 | | |
| *6 | 16.60964 | 0.194 | 1.63400 | 23.80 |
| *7 | 10.21639 | 0.312 | | |
| *8 | −3.06261 | 0.770 | 1.54400 | 55.90 |

TABLE 7-continued

Example 4
f = 3.987, Bf = 0.846, Fno. = 2.30, 2ω = 68.0

| Si | Ri | Di | Ndj | νdj |
|---|---|---|---|---|
| *9 | −1.12392 | 0.339 | | |
| *10 | −5.96488 | 0.638 | 1.53500 | 56.30 |
| *11 | 1.67163 | 0.347 | | |
| 12 | ∞ | 0.300 | 1.51700 | 64.20 |
| 13 | ∞ | 0.301 | | |
| 14 (IMG) | ∞ | | | |

TABLE 8

Example 4

| | Surface Numbers | | | | |
|---|---|---|---|---|---|
| | 1 | 2 | 4 | 5 | 6 |
| KA | −3.9830250E+00 | −6.2397620E+02 | −2.0008990E+02 | −8.6855310E+00 | −1.7046630E+03 |
| A4 | 2.1144277E−01 | −7.4987926E−03 | 3.3637918E−02 | 6.0014643E−02 | −2.7053758E−01 |
| A6 | −1.5985666E−01 | 4.0209497E−02 | 3.6498894E−02 | 5.2736071E−02 | −1.7273625E−01 |
| A8 | 1.6543232E−01 | −1.4460658E−01 | 1.8525655E−01 | 1.7518929E−01 | 2.2019251E−01 |
| A10 | −1.0006688E−01 | 2.8882759E−01 | −6.2250114E−01 | −2.8285203E−01 | −2.5632464E−01 |
| A12 | 2.0147548E−02 | −3.2602558E−01 | 8.3042623E−01 | 2.4906649E−01 | 1.9502461E−01 |
| A14 | −1.4515007E−02 | 1.3518664E−01 | −3.9547851E−01 | −6.9439875E−02 | 3.6341474E−03 |
| A16 | 4.5597603E−03 | −2.1011903E−02 | −1.5751736E−03 | 3.3110032E−02 | 1.5251735E−02 |

| | Surface Numbers | | | | |
|---|---|---|---|---|---|
| | 7 | 8 | 9 | 10 | 11 |
| KA | −5.6741970E+02 | 6.0585410E+00 | −2.9039200E+00 | −4.8773460E+01 | −6.9579440E+00 |
| A4 | −2.1263794E−01 | −3.4939400E−03 | −1.3929282E−01 | −6.0625735E−02 | −5.7178891E−02 |
| A6 | −9.6350801E−02 | 3.1212838E−02 | 1.1492849E−01 | −7.0203770E−03 | 1.7590357E−02 |
| A8 | 1.0435177E−01 | −1.5135765E−01 | −9.9465152E−02 | 1.0750296E−02 | −5.8838015E−03 |
| A10 | −2.8099038E−02 | 2.0093158E−01 | 4.7404386E−02 | −1.1200380E−03 | 1.1770150E−03 |
| A12 | 3.1153821E−02 | −1.0432419E−01 | −8.3952823E−03 | −2.1351911E−04 | −1.2412733E−04 |
| A14 | −3.1496613E−03 | 1.9114192E−02 | 9.2404116E−05 | 1.5037617E−05 | 4.4139992E−06 |
| A16 | −1.4075313E−03 | 2.6970775E−04 | −3.0115262E−05 | 2.9012945E−06 | 1.3509229E−07 |

TABLE 9

Example 5
f = 4.026, Bf = 0.813, Fno. = 2.29, 2ω = 68.0

| Si | Ri | Di | Ndj | νdj |
|---|---|---|---|---|
| *1 | 1.41052 | 0.608 | 1.54400 | 55.90 |
| *2 | −16.42701 | −0.017 | | |
| 3 (St) | ∞ | 0.166 | | |
| *4 | −10.04807 | 0.200 | 1.63400 | 23.80 |
| *5 | 3.40681 | 0.512 | | |
| *6 | 13.26741 | 0.200 | 1.63400 | 23.80 |
| *7 | 12.54925 | 0.365 | | |
| *8 | −3.24669 | 0.745 | 1.54400 | 55.90 |
| *9 | −1.12831 | 0.274 | | |
| *10 | −4.46022 | 0.715 | 1.53500 | 56.30 |
| *11 | 1.67583 | 0.313 | | |
| 12 | ∞ | 0.300 | 1.51700 | 64.20 |
| 13 | ∞ | 0.302 | | |
| 14 (IMG) | ∞ | | | |

TABLE 10

Example 5

| | Surface Numbers | | | | |
|---|---|---|---|---|---|
| | 1 | 2 | 4 | 5 | 6 |
| KA  | −3.7132630E+00 | −5.8048790E+02 | −2.4068880E+02 | −6.2736260E+00 | −9.4642810E+02 |
| A4  | 2.1059987E−01 | −6.6508881E−03 | 3.3295115E−02 | 6.6290687E−02 | −2.6750366E−01 |
| A6  | −1.6164829E−01 | 4.0303497E−02 | 3.5887947E−02 | 5.4499763E−02 | −1.8277152E−01 |
| A8  | 1.6358254E−01 | −1.4957427E−01 | 1.8839479E−01 | 1.7218482E−01 | 2.0488593E−01 |
| A10 | −1.0185979E−01 | 2.8412403E−01 | −6.1297055E−01 | −2.9126170E−01 | −2.6265705E−01 |
| A12 | 2.0432277E−02 | −3.2905815E−01 | 8.4877381E−01 | 2.3773499E−01 | 1.9532079E−01 |
| A14 | −1.5076664E−02 | 1.4162631E−01 | −3.8448328E−01 | −4.6795744E−02 | 4.1441729E−03 |
| A16 | 2.1595518E−03 | 1.2167173E−02 | −1.6489199E−02 | 1.6558675E−01 | 8.3132458E−05 |

| | Surface Numbers | | | | |
|---|---|---|---|---|---|
| | 7 | 8 | 9 | 10 | 11 |
| KA  | −6.3209390E+02 | 5.7975050E+00 | −3.0333230E+00 | −8.7103880E+00 | −8.2644230E+00 |
| A4  | −2.0635849E−01 | 1.8594630E−02 | −1.2853708E−01 | −6.0351997E−02 | −6.4273204E−02 |
| A6  | −9.5711932E−02 | 3.4073434E−02 | 1.1494795E−01 | −6.8819454E−03 | 1.7457938E−02 |
| A8  | 1.0748005E−01 | −1.5173523E−01 | −9.9336505E−02 | 1.0777010E−02 | −5.8954018E−03 |
| A10 | −2.6013510E−02 | 2.0047444E−01 | 4.7565049E−02 | −1.1149303E−03 | 1.1760298E−03 |
| A12 | 3.2701336E−02 | −1.0466098E−01 | −8.2426299E−03 | −2.1239538E−04 | −1.2407935E−04 |
| A14 | −3.7921004E−03 | 1.8965462E−02 | 1.0485620E−04 | 1.5288996E−05 | 4.4806071E−06 |
| A16 | −4.5643707E−03 | 3.2339593E−04 | −2.6904188E−05 | 2.9798736E−06 | 1.4233917E−07 |

TABLE 11

Values With Respect To Conditional Expressions

| Expression Numbers | Conditional Expressions | Example 1 | Example 2 | Example 3 | Example 4 | Example 5 |
|---|---|---|---|---|---|---|
| (1A), (1B) | f/f45 | −0.065 | −0.073 | −0.018 | −0.053 | −0.175 |
| (2) | (R2f − R2r)/(R2f + R2r) | 2.169 | 2.029 | 2.387 | 1.815 | 2.026 |
| (3) | f/f4 | 2.034 | 1.580 | 1.718 | 1.393 | 1.424 |

Note that all of the aforementioned paraxial radii of curvature, distances between surfaces, refractive indexes, and Abbe numbers are obtained by experts who conduct optical measurements using the following methods.

The paraxial radii of curvature are obtained by using the ultra accuracy 3-D profilometer, UA3P (manufactured by Panasonic Factory Solutions Co., Ltd.) to measure lenses and by performing the following procedures. A provisional set paraxial radius of curvature $R_m$ (m is a positive integer) and conical coefficient $K_m$ are input into UA3P, and then an nth ordinal aspherical surface coefficient An in the aspherical surface shape formula is calculated from these values and the measured data by using a fitting function of UA3P. In the aforementioned aspherical surface shape formula (A), it is presumed that $C=1/R_m$, $KA=K_m-1$. The depth Z of an aspheric surface along the direction of the optical axis according to the height h from the optical axis is calculated from values of $R_m$, $K_m$, An, and the aspherical surface shape formula (A). The difference between the calculated depth Z and the actually measured depth Z' at each height h from the optical axis is obtained and used for determining whether this difference falls within a predetermined range. In the case that the difference is within the predetermined range, $R_m$ which has been set is designated as the paraxial radius of curvature. Meanwhile, in the case that the difference is out of the predetermined range, at least either one of the values of $R_m$ and $K_m$ which have been used for calculating the difference will be changed and set as $R_{m+1}$, $K_{m+1}$ to be input into UA3P. Then, the same process as described above will be performed and the process for determining whether the difference between the calculated depth Z and the actually measured depth Z' at each height h from the optical axis is within the predetermined range will be repeated. This will be repeated until the difference between the calculated depth Z and the actually measured depth Z' at each height h from the optical axis becomes within the predetermined range. Note that the predetermined range referred to here intends to be within 200 nm. In addition, the range of h refers to a range corresponding to the range between 0 and ⅕ of the maximum outer diameter of a lens.

The distances between surfaces are obtained by using Non-Contact Thickness and Spacing Measurement of Lenses and within Optical Systems, OptiSurf® (manufactured by Trioptics).

The refractive index is obtained by using the precision refractometer KPR-2000 (manufactured by Shimazu Corporation) in a state that the temperature of an object to be tested is maintained at 25 c°. The refractive index which has been measured based on the d-line (wavelength: 587.6 nm) is designated as Nd. Similarly, the refractive index which has been measured based on the e-line (wavelength: 546.1 nm) is designated as Ne, the refractive index which has been measured based on the F-line (wavelength: 486.1 nm) is designated as NF, the refractive index which has been measured based on the C-line (wavelength: 656.3 nm) is designated as NC, and the refractive index which has been measured based on the g-line (wavelength: 435.8 nm) is designated as Ng. The Abbe number vd with respect to the d-line is calculated by substituting the Nd, NF, NC obtained by the aforementioned measurement into a formula: vd=(Nd−1)/(NF−NC).

What is claimed is:

1. An imaging lens substantially consisting of five lenses, including:
   a first lens of being a biconvex shape;
   a second lens having a negative refractive power;
   a third lens having a negative refractive power and a convex surface that faces the object side;
   a fourth lens having a positive refractive power;
   a fifth lens having a negative refractive power, of which at least one surface of an object-side surface and an image-side surface has at least one inflection point, in this order from the object side; and
   wherein conditional expressions (1A) and (2) below are satisfied:

$$-0.38 < f/f45 < -0.01 \quad (1A),$$ where f: the focal length of the entire system, and
   f45: the combined focal length of the fourth lens and the fifth lens, and $$1.7 < (R2f - R2r)/(R2f + R2r) \quad (2),$$ where R2f: the paraxial radius of curvature of the object-side surface of the second lens, and
   R2r: the paraxial radius of curvature of the image-side surface of the second lens.

2. The imaging lens of claim 1, wherein the fifth lens is of a biconcave shape.

3. The imaging lens of claim 1, wherein conditional expression below is further satisfied:

$$-0.27 < f/f45 < -0.015 \quad (1A-1).$$

4. The imaging lens of claim 1, wherein conditional expression is further satisfied:

$$-0.25 < f/f45 < -0.02 \quad (1A-2).$$

5. The imaging lens of claim 1, wherein the second lens is of a biconcave shape.

6. The imaging lens of claim 1, wherein the fourth lens is of a meniscus shape having a convex surface that faces the image side.

7. The imaging lens of claim 1, wherein an aperture stop is provided between the object-side surface of the first lens L1 and the object-side surface of the second lens L2.

8. The imaging lens of claim 1, wherein conditional expression below is further satisfied:

$$0 < f/f4 < 1.9 \quad (3),$$ where f4: the focal length of the fourth lens.

9. The imaging lens of claim 1, wherein conditional expression below is further satisfied:

$$1.7 < (R2f - R2r)/(R2f + R2r) < 4 \quad (2-1),$$ where

R2f: the paraxial radius of curvature of the object-side surface of the second lens, and
   R2r: the paraxial radius of curvature of the image-side surface of the second lens.

10. The imaging lens of claim 1, wherein conditional expression below is further satisfied:

$$1.8 < (R2f - R2r)/(R2f + R2r) < 3.5 \quad (2-2),$$ where

R2f: the paraxial radius of curvature of the object-side surface of the second lens, and
    R2r: the paraxial radius of curvature of the image-side surface of the second lens.

11. The imaging lens of claim 1, wherein conditional expression below is further satisfied:

$$0 < f/f4 < 1.8 \quad (3-1),$$ where f4: the focal length of the fourth lens.

12. The imaging lens of claim 1, wherein conditional expression below is further satisfied:

$$0 < f/f4 < 1.75 \quad (3-2),$$ where f4: the focal length of the fourth lens.

13. An imaging apparatus, including the imaging lens of claim 1.

14. The imaging lens substantially consisting of five lenses, including:
    a first lens of being a biconvex shape;
    a second lens having a negative refractive power;
    a third lens having a negative refractive power and a convex surface that faces the object side;
    a fourth lens having a positive refractive power;
    a fifth lens having a biconcave shape, of which at least one surface of an object-side surface and an image-side surface has at least one inflection point, in this order from the object side; and
    wherein conditional expressions (1B) and (2) below are satisfied:

$$f/f45 < 0 \quad (1B),$$ where f: the focal length of the entire system, and
    f45: the combined focal length of the fourth lens and the fifth lens, and $$1.7 < (R2f - R2r)/(R2f + R2r) \quad (2),$$ where R2f: the paraxial radius of curvature of the object-side surface of the second lens, and
    R2r: the paraxial radius of curvature of the image-side surface of the second lens.

15. The imaging lens of claim 14, wherein conditional expression below is further satisfied:

$$-2 < f/f45 < 0 \quad (1B-1).$$

16. The imaging lens of claim 14, wherein conditional expression below is further satisfied:

$$-1 < f/f45 < 0 \quad (1B-2).$$

17. An imaging apparatus, including: The the imaging lens of claim 14.

* * * * *